(12) United States Patent
Groth et al.

(10) Patent No.: US 6,624,282 B2
(45) Date of Patent: Sep. 23, 2003

(54) REACTIVE COMPOSITIONS WITH AN EXTENDED POT LIFE

(75) Inventors: Stefan Groth, Leverkusen (DE); Josef Pedain, Köln (DE); Lutz Schmalstieg, Köln (DE); Detlef-Ingo Schütze, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 08/908,655

(22) Filed: Aug. 7, 1997

(65) Prior Publication Data

US 2002/0177682 A1 Nov. 28, 2002

(30) Foreign Application Priority Data

Aug. 16, 1996 (DE) .......................... 196 32 925

(51) Int. Cl.$^7$ .............................. C08G 18/10
(52) U.S. Cl. ........................... 528/65; 528/66; 528/79; 427/388.1; 427/389; 427/389.9; 427/393.5
(58) Field of Search .............................. 528/66, 65, 79; 427/388.1, 389, 389.9, 393.5

(56) References Cited

U.S. PATENT DOCUMENTS

| | | | |
|---|---|---|---|
| 3,945,981 A | * 3/1976 | Robertson | 156/238 |
| 4,086,214 A | 4/1978 | Cardy | 260/77.5 AN |
| 4,119,594 A | 10/1978 | Iobst et al. | 260/18 TN |
| 4,248,756 A | 2/1981 | König et al. | 260/31.2 N |
| 4,446,293 A | 5/1984 | König et al. | 528/45 |
| 5,175,230 A | * 12/1992 | Quay et al. | 528/59 |
| 5,496,496 A | * 3/1996 | Kajita et al. | 528/76 |

* cited by examiner

*Primary Examiner*—Rachel Gorr
(74) *Attorney, Agent, or Firm*—Joseph C. Gil; Thomas W. Roy; Richard E.L. Henderson

(57) ABSTRACT

The present invention relates to reactive compositions containing (A) NCO prepolymers based on (cyclo)aliphatic polyisocyanates having an NCO content of 1 to 8 wt. % and a monomeric polyisocyanate content of less than 2 wt. %, (B) amine-free chain extenders containing at least 50 equivalent percent of a compound melting between 50° and 160° C. having formula (I)

$$\text{HO—X—Y—X—OH} \quad \text{(I)}$$

wherein

Y denotes methylene, ethylene, —C≡C—, 1,4-, 1,3-, or 1,2-cyclohexylene, or 1,4-, 1,3-, or 1,2-phenylene, and X denotes methylene, —OCH$_2$CH$_2$— (wherein oxygen is bonded to group Y), or 1,4-, 1,3-, or 1,2-cyclohexylene, and (C) 0 to 20 wt. %, relative to component (A), of inert organic solvents, wherein the equivalent ratio of the free NCO groups of component (A) to the NCO-reactive groups of component (B) is 0.90 to 1.35.

11 Claims, No Drawings

REACTIVE COMPOSITIONS WITH AN EXTENDED POT LIFE

BACKGROUND OF THE INVENTION

The present invention relates to reactive compositions based on NCO prepolymers and polyol chain extenders having an extended pot life at room temperature and a high reactivity at elevated temperature, as well as the use of these compositions to coat substrates of any type, principally flexible substrates such as textiles and leather.

Solvent-free or low-solvent reactive compositions based on NCO prepolymers are known. Such compositions are prepared by mixing a ketoxime-blocked NCO pre-polymer based on an aromatic polyisocyanate with a polyamine chain extender, followed by curing the composition by heat treatment (which results in splitting off the ketoxime) and optionally evaporating the solvent. Reactive compositions of this type used for coating flexible substrates are described, for example, in German Offenlegungsschrift 2,902,090.

Reactive compositions based on ketoxime-blocked prepolymers of aliphatic poly-isocyanates are also known. E.g., European Patent Application 65,688. However, they require substantially longer curing times than the systems based on aromatic polyisocyanates, which is the reason that reactive systems based on aliphatic poly-isocyanates have not previously been used widely in industry.

During curing of the two systems described above, the ketoxime splits off, which means that the waste air must be treated even if the systems do not contain solvents. Furthermore, blocking of free NCO groups leads to additional urethane groups and thus to an increase in the viscosity of the compositions, which in most cases must be compensated for by adding solvents.

The object of the present invention was, therefore, to provide reactive compositions based on NCO prepolymers that overcome the disadvantages of the prior art. It has now surprisingly been found that this object can be achieved by choosing specific polyols as chain extenders.

SUMMARY OF THE INVENTION

The present invention accordingly provides reactive compositions comprising (A) an NCO prepolymer based on aliphatic and/or cycloaliphatic polyisocyanates and having an NCO content of 1 to 8 wt. % (preferably 2 to 4 wt. %) based on the aliphatic and/or cycloaliphatic polyisocyanate and a monomeric polyisocyanate content of less than 2 wt. % (preferably less than 0.5 wt. %) (quantities in each case being relative to component (A)), (B) an amine-free chain extender comprising at least 50 equivalent percent (preferably at least 80 equivalent percent), relative to the NCO-reactive groups of the chain extender, of compounds melting between 50° and 160° C. and having the formula (I)

HO—X—Y—X—OH     (I)

wherein

Y denotes methylene, ethylene, —C≡C—, 1,4-, 1,3-, or 1,2-cyclohexylene, or 1,4-, 1,3-, or 1,2-phenylene, and X denotes methylene, —OCH₂CH₂— (wherein oxygen is bonded to group Y), or 1,4-, 1,3-, or 1,2-cyclohexylene, and (C) 0 to 20 wt. % (preferably 0 to 15 wt. %), relative to component (A), of inert organic solvents, wherein the equivalent ratio of the free NCO groups of component (A) to the NCO-reactive groups of component (B) is 0.90 to 1.35 (preferably 1 to 1.25).

DETAILED DESCRIPTION OF THE INVENTION

The most preferred compound of formula (I) is 1,4-bis (2-hydroxy-ethoxy)benzene.

As used hereinafter, the expression "mean molecular weights" is understood to mean number average molecular weights.

The use of 1,4-bis(2-hydroxyethoxy)benzene as a structural element for polyurethanes is known. See I. S. Lin., J. Biranowski, D. H. Lorenz, *Adv. Urethane Sci. Technol.*, 8, 105–117 (1981); B. L. Williams, L. Weissbein, A. Singh, *Rubber Age*, 57–65 (1968); and S. A, Iobst, H. W. Cox, *J. Appl. Polym. Sci.* 23, 2513–2527 (1979).

In addition, compounds of formula (I) have already been recommended in individual cases as a chain extender for reactions involving NCO prepolymers. Cf. U.S. Pat. No. 4,119,594. This patent, however, concerns reactive systems using prepolymers based on aromatic polyisocyanates and accordingly cannot contribute to achieving the above-mentioned object.

It has now been found that the success of the present invention can be promoted by ensuring that the compound of formula (I) is heterogeneous with respect to the remaining components of the reactive composition (i.e., particularly component (A) and optionally the proportion of component (B) that is not a compound of formula (I)). Particularly favorable results are achieved if the compound of formula (I) is present in solid form under the mixing condition (i.e., at temperatures of up to 50° C.). In this respect, the present invention differs from the process of U.S. Pat. No. 4,086, 214, which teaches that heterogeneity between the chain extender and higher molecular weight polyol should be avoided by a preliminary reaction with part of the isocyanate.

A reaction mixture is considered to be heterogeneous if the compound of formula (I) is present in an amount exceeding 50% in the form of particles having a mean particle size of more than 1 μm. The mean particle size is the particle size above and below which 50 wt. % of the particles are present.

Preferred NCO prepolymers (A) have specific number average molecular weights of 500 to 10,000 (preferably 700 to 8000).

The NCO prepolymers (A) can be prepared by reacting organic polyisocyanates (a) with NCO-reactive compounds (b). Suitable organic polyisocyanates (a) include aliphatic and cycloaliphatic polyisocyanates. Preferred polyisocyanates (a) are compounds of the formula Q(NCO)$_n$ having a mean molecular weight below 800, wherein n is a number from 2 to 4 and Q is an aliphatic C$_4$–C$_{12}$ hydrocarbon group or a cycloaliphatic C$_6$–C$_{15}$ hydrocarbon group, for example, diisocyanates from the series 4,4'-diisocyanatodicyclohexylmethane, 3-isocyanatomethyl-3,3, 5-trimethylcyclohexylisocyanate (isophorone diisocyanate, or IPDI), tetramethylene diisocyanate, hexamethylene diisocyanate (HDI), 2-methylpentamethylene diisocyanate, 2,2, 4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanatodicyclohexylpropane-(2,2), 3-isocyanatomethyl-1-methyl-1-isocyanatocyclohexane (IMCI), 1,3-diisocyanato-4-methylcyclohexane, 1,3-diisocyanato-2-methylcyclohexane, and α,α,α',α'-tetramethyl-m- or -p-xylylene diisocyanate (TMXDI), as well as mixtures consisting of these compounds.

It is preferred to use 4,4'-diisocyanatodicyclohexylmethane, especially industrial grade 4,4'-diisocyanatodicyclohexylmethane containing 10 to 50 wt. % (preferably 15 to 20 wt. %) of trans,trans-4,4'-diisocyanatodicyclohexylmethane.

For special applications, other polyisocyanates may also be used in amounts of up to 10 equivalent percent relative to the NCO groups of the total polyisocyanates (a), as described, for example, in *Methoden der organischen Chemie* (Houben-Weyl), Vol. 14/2, Georg Thieme-Verlag, Stuttgart, 1963, pages 61 to 70, and W. Siefken in *Liebigs Annalen der Chemie*, 562, pages 75 to 136. It is particularly preferred, however, to use only aliphatic and/or cycloaliphatic diisocyanates, especially 4,4'-diisocyanatodicyclohexylmethane, as the sole polyisocyanate.

Particularly preferred NCO-reactive compounds (b) are polyols. Higher molecular weight hydroxyl compounds and, to a lesser extent, also lower molecular weight hydroxyl compounds may be used as polyols.

Higher molecular weight hydroxyl compounds include the hydroxy polyesters, hydroxy polyethers, hydroxy polythioethers, hydroxy polyacetals, hydroxy polycarbonates, and dimeric fatty alcohols and/or ester amides conventionally used in polyurethane chemistry, each having mean molecular weights of 400 to 8000 (preferably those compounds with mean molecular weights of 500 to 6500). Hydroxy polyethers, hydroxy polyesters, and hydroxy polycarbonates are particularly preferred. Polyols conventionally used in polyurethane chemistry having molecular weights of 62 to 399 may be used as lower molecular weight polyhydroxyl compounds, for example, ethylene glycol, triethylene glycol, tetraethylene glycol, 1,2- and 1,3-propanediol, 1,4- and 1,3-butanediol, 1,6-hexanediol, 1,8-octanediol, neopentyl glycol, 1,4-bis(hydroxymethyl)cyclohexane, bis(hydroxymethyl)tricyclo[5.2.1.0$^{2.6}$]decane, 1,4-bis(2-hydroxyethoxy)benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, 1,2,6-hexanetriol, 1,2,4-butanetriol, pentaerythritol, quinitol, mannitol, sorbitol, methyl glycoside, and 4,3,6-dianhydrohexitol.

Suitable polyether polyols are conventional polyethers known in polyurethane chemistry, for example, the addition or mixed addition compounds of tetrahydrofuran, styrene oxide, ethylene oxide, propylene oxide, butylene oxides, or epichlorohydrin, especially of ethylene oxide and/or propylene oxide, prepared using difunctional to hexafunctional starter molecules such as water or the aforementioned polyols or amines having 1 to 4 NH bonds. Particularly preferred are propylene oxide polyethers having on average 2 to 4 hydroxyl groups, which may also contain up to 50 wt. % of incorporated polyethylene oxide units.

Suitable polyester polyols are, for example, reaction products of polyhydric alcohols (preferably dihydric and optionally in addition trihydric alcohols) with poly-basic carboxylic acids (preferably dibasic carboxylic acids). Instead of the free polycarboxylic acids, the corresponding polycarboxylic acid anhydrides or corresponding polycarboxylic acid esters of lower alcohols or their mixtures may also be used to prepare the polyesters. The polycarboxylic acids may be aliphatic, cycloaliphatic, aromatic, and/or heterocyclic and optionally may be substituted, for example, with halogen atoms, and/or may be unsaturated. Examples of suitable acids include adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylenetetrahydrophthalic anhydride, maleic anhydride, maleic acid, fumaric acid, dimeric and trimeric fatty acids such as oleic acid (optionally mixed with monomeric fatty acids), terephthalic acid dimethyl ester, and terephthalic acid bis-glycol ester. The above-mentioned polyols are suitable as polyhydric alcohols.

According to the invention, hydroxy polyesters having 2 or 3 terminal OH groups and melting below 60° C. are preferred.

Suitable polycarbonate polyols may be obtained by reaction of carboxylic acid derivatives (for example, diphenyl carbonate or phosgene) with diols. Suitable diols include, for example, ethylene glycol, triethylene glycol, tetramethylene glycol, neopentyl glycol, 1,4-bis(hydroxymethyl)cyclohexane, bis(hydroxymethyl)tricyclo[5.2.1.0$^{2.6}$]decane or 1,4-bis(2-hydroxyethoxy)benzene, 2-methyl-1,3-propanediol, 2,2,4-trimethylpentanediol, dipropylene glycol, polypropylene glycols, dibutylene glycol, polybutylene glycols, bisphenol A and tetrabromobisphenol A, or mixtures of the aforementioned diols. The diol component preferably contains 40 to 100 wt. % of hexanediol, preferably 1,6-hexanediol and/or hexanediol derivatives, preferably those that contain ether or ester groups in addition to terminal OH groups, for example, products that have been obtained by reaction of 1 mole of hexanediol with at least 1 mole (preferably 1 to 2 moles) of caprolactone according to German Auslegeschrift 1,770,245 or by self-etherification of hexanediol to form dihexylene glycol or trihexylene glycol. The preparation of such derivatives is known, for example, from German Auslegeschrift 1,570,540. The polyether polycarbonate diols described in German Offenlegungsschrift 3,717,060 are also suitable.

The hydroxy polycarbonates should be substantially linear. They may, however, also be slightly branched, if desired, by incorporating polyfunctional components, especially low molecular weight polyols. Suitable compounds for this purpose include for example trimethylolpropane, 1,2,6-hexanetriol, glycerol, 1,2,4-butanetriol, pentaerythritol, quinitol, mannitol, sorbitol, methyl glycoside, and 4,3,6-dianhydrohexitol.

Particularly preferred polyols for use as NCO-reactive compounds (b) are (i) polypropylene oxide polyethers and/or polyethylene oxide polyethers containing 2 to 3 hydroxyl groups and having a mean molecular weight of 500 to 8000 and/or (ii) adipic acid polyesters containing 2 to 3 hydroxyl groups and having a mean molecular weight of 1000 to 6000.

Component (A) may be prepared in a known manner by reaction of the above-mentioned polyhydroxyl compounds with excess diisocyanate, preferably at ca. 70° C. to 120° C. An NCO/OH ratio of 1.5:1 to 20:1 (preferably 1.7:1 to 15:1) is selected, and excess monomer is optionally separated from the prepolymer by known technical methods, for example, thin layer distillation or extraction, so that the polyisocyanate residual monomer content is less than 2 wt. % (preferably less than 0.5 wt. %). Particularly preferred is an NCO/OH ratio of 4:1 to 15:1 and subsequent separation of the monomer by thin layer distillation to give a residual monomer content of less than 0.5 wt. %. The NCO prepolymers prepared in this way according to the present invention were found to exhibit a particularly optimum combination of long pot life on the one hand and rapid curing on the other hand.

Component (A) can be mixed with up to 20 wt. % (preferably up to 15 wt. %), relative to the NCO prepolymer, of organic solvents (C) in order to adjust the optimum viscosity for application, which is 20,000 to 40,000 mPa·s at 20° C. The solvent-free variant is particularly preferred.

Preferred chain extenders (B), in particular preferred compounds of formula (I), are compounds that do not dissolve below 50° C. in prepolymer (A). Particularly preferred compounds of formula (I) include, for example, 1,2-bis(2-hydroxyethoxy)benzene, 1,3-bis(2-hydroxyethoxy)benzene, trans-1,4-bishydroxymethylcyclohexane, 1,2-bis(4-hydroxycyclohexyl)ethane, bis(4-hydroxycyclohexyl)methane, and 2-butyne-1,4-diol.

The most preferred compound of formula (I) is 1,4-bis(2-hydroxyethoxy)benzene.

Component (B) can be mixed as such directly with the prepolymer. It has, however, been found convenient, in order to improve metering, to mix and stir the normally solid compounds of formula (I) in a liquid component. Such mixtures preferably comprise 20 to 90 wt. % (particularly 40 to 70 wt. %) of compounds of formula (I) and 10 to 80 wt. % (particularly 30 to 60 wt. %) of liquid component. The liquid component may be one of the above-mentioned higher molecular weight polyols and/or a plasticizer that does not react with isocyanates and/or a solvent, for example, castor oil. Preferred mixing agents are polyols containing 2 or 3 OH groups, such as those described above.

In order to match the reactive compositions according to the invention with the mechanical processing parameters, it is recommended to use a catalyst for the reaction between components (A) and (B). Such catalysts may be contained in the component (A) or (B) or may be added to the ready-to-use mixture. Suitable catalysts are all those known for NCO/OH addition, for example, those described in *Kunststoffhandbuch* (*Handbook of Plastics*) (published by Becker/Braun), 2nd Edition, Vol. 7, *Polyurethanes*, pages 92 ff, Carl Hanser-Verlag, Munich/Vienna, 1983. Such catalysts include for example amines such as 1,4-diazabicyclo-[2.2.2]octane (DABCO), 1-azabicyclo[2.2.2]octane (quinuclidine), 1,8-diazabicyclo[5.4.0]undecene-7 (DBU), 1,5-diazabicyclo[4.3.0]nonene-5 (DBN), dimethylbenzylamine, triethylamine, N-methylmorpholine, and N,N-dimethylpiperazine.

Preferred catalysts include organometallic catalysts, for example, organic titanium, zinc, bismuth, or tin compounds, preferably titanium, zinc, bismuth, or tin oxides, hydroxides, and salts of $C_1$–$C_{24}$ monocarboxylic acids as well as di($C_1$–$C_{12}$ alkyl)tin $C_1$–$C_{18}$ monocarboxylates or dicarboxylates, such as tetraisopropyl titanate, dibutyltin(IV) oxide, tin(II) octoate, tin(II) stearate, dibutyltin(IV) dilaurate, dibutyltin(IV) diacetate, dimethyltin(IV) dilaurate, dioctyltin(IV) dilaurate, dioctyltin(IV) bis(isooctylmercaptoacetate), dibutyltin(IV) bis(isooctylmercaptoacetate), dimethyltin(IV) bis(isooctylmercaptoacetate), dibutyltin(IV) bis(thiododecylate), dimethyltin(IV) bis(thiododecylate), dioctyltin(IV) bis(thiododecylate), dibutyltin(IV) dithioglycolate, dibutyltin(IV) maleate, and dimethyltin(IV) maleate, as well as mixtures of these aforementioned catalysts with one another and with the amines mentioned above.

Most preferred catalysts in the context of the invention are dioctyltin(IV) bis(isooctylmercaptoacetate), dibutyltin(IV) bis(isooctylmercaptoacetate), and dimethyltin(IV) bis(isooctylmercaptoacetate) as well as latent catalysts derived from tin or bismuth compounds and mercapto compounds, such as those described, for example, in U.S. Pat. No. 4,788,083 (counterpart of German Offenlegungsschrift 3,709,631).

U.S. Pat. No. 4,788,083 relates to an activatable catalyst that can be activated by an amine activator or by heating and that is a reaction product of (a) a metal catalyst, namely a tin catalyst, a bismuth catalyst, or a mixture thereof, with (b) a molar excess of one of the following chelating agents: (1) a mercapto compound, (2) a polyphenol that can react with an isocyanate group in the presence of a tertiary amine as activator, or (3) mixtures thereof.

Preferred metal catalysts (a) comprise tin compounds from the series tin(IV) oxide, tin(II) octoate, dibutyltin dioctoate, a tin mercaptide (e.g., dibutyltin dilauryl mercaptide), tin(II) citrate, tin(II) acetate, tin(II) oxalate, tin(II) chloride, tin(IV) chloride, tetraphenyltin, tetrabutyltin, tri-n-butyltin acetate, a dialkyltin dicarboxylate (e.g., dibutyltin dilaurate, dibutyltin dioctoate, and dioctyltin dioctoate), and dimethyltin dichloride, or mixtures thereof, and bismuth compounds from the series bismuth tricarboxylate, bismuth nitrate, bismuth halides, bismuth sulphide, and basic bismuth dicarboxylate, or mixtures thereof.

Preferred mercapto compounds (b)(1) include, for example, trimethylolpropane tri(3-mercaptopropionate), pentaerythritol tetra-(3-mercaptopropionate), glycol di(3-mercaptopropionate),glycol dimercaptoacetate, trimethylolpropane trithioglycolate, mercaptodiethyl ether, ethanedithiol, thiolactic acid, mercaptopropionic acid or esters thereof, thiophenol, thioacetic acid, 2-mercaptoethanol, 1,4-butanedithiol, 2,3-dimercaptopropanol, toluene-3,4-dithiol, αα'-dimercapto-p-xylene, thiosalicylic acid, mercaptoacetic acid and esters thereof, dodecanedithiol, didodecanedithiol, dithiophenol, di-p-chlorothiophenol, dimercaptobenzothiazole, 3,4-dimercaptotoluene, allyl mercaptan, benzyl mercaptan, 1,6-hexanedithiol, 1-octanethiol, p-thiocresol, 2,3,5,6-tetrafluorothiophenol, cyclohexyl mercaptan, methyl thioglycolate, a mercaptopyridine, dithioerythritol, 6-ethoxy-2-mercaptobenzothiazole, and d-limonene-dimercaptan, or mixtures thereof.

Preferred polyphenols (b)(2) include, for example, pyrocatechol, pyrogallol, and 3-methoxypyrocatechol,or mixtures thereof.

The molar ratio of mercapto groups of the mercapto compounds (b)(1) or of phenolic hydroxyl groups of the polyphenol (b)(2) to the metal content of the metal catalyst (a) is generally in the range from 2:1 to 500:1.

Also of particular use as amine activators are tertiary amines, for example, triethylamine, dimethylethylamine, tetramethylethylenediamine, trimethylamine, tributylamine, dimethylbenzylamine, dimethylcyclohexylamine, dimethylethanolamine, diethylethanolamine, triethanolamine, pyridine, 4-phenylpropylpyridine, 2,4,6-collidine, quinoline, tripropylamine, isoquinoline, N-ethylmorpholine, and triethylenediamine, or mixtures thereof.

The amount of catalyst or catalyst system used according to the invention is 0.01 to 3 wt. % (preferably 0.1 to 1.0 wt. %), relative to the total weight of component (A) and component (B).

The NCO prepolymer (A) is generally mixed with the chain extender component (B) approximately in the ratio of the equivalent weights of these components, although for some intended applications, an undercuring is also convenient, with the result that the equivalent ratio of NCO to OH according to the invention is generally 0.90 to 1.35 (preferably 1.0 to 1.25).

To prepare the ready-to-use reactive compositions, additives such as pigments, UV stabilizers, flow control agents, antioxidants, fillers, or blowing agents may also be mixed in.

The reactive compositions according to the invention have a so-called pot life of at least 4 hours (preferably at least 8 hours). The term "pot life" is understood to mean the time from the admixture of the chain extender (B) until the viscosity measured in mPa·s at 23° C., doubles in value. The compositions according to the invention thus remain workable over the course of a working day after admixture of the chain extender (B).

The reactive compositions according to the invention can be processed in any conceivable way, for example, by casting, compression molding, but are preferably processed by coating on a substrate in thin layers according to the direct coating process on textile and leather, preferably according to the reverse coating process.

The compounds according to the invention may also be used as adhesives or binders for any materials, e.g. wood, paper, leather, plastics, charcoal, silicas or metal oxides.

The cure time is 2 to 18 minutes (preferably 6 to 12 minutes). The expression "cure time" is understood to be the time that a 100 μm thick layer of the reactive composition must be exposed to a stepwise heat treatment at 80°, 120°, and 160° C. of, respectively, a third of the total time in order to produce a coherent polymer film with an almost constant 100% modulus (according to DIN 53504). In this connection "almost constant" means that the 100% modulus of a polymer film that, immediately following the cure time at 160° C. is then heated for a further third of the total cure time at 160° C., does not differ by more than 5% from the modulus of the polymer film produced as described above.

The short cure time enables coating to be carried out at high speed. It is of course possible by choosing a relevant specific chemical structure of the NCO prepolymer to produce layers having different properties, for example, an adhesion layer, foam layer, intermediate layer or outer layer. A particular advantage is that the coatings are heat weldable as well as high-frequency weldable because of their melting behavior below 200° C.

A reverse coating can be prepared, for example, in the following way. The reactive composition for the outer layer is first applied in an amount of about 30 to 100 g/m² to a suitable intermediate carrier (for example a release paper), the reactive composition is dried in a drying tunnel, the reactive composition for the anchor coating is then applied to the dry outer layer, likewise in an amount of ca 30 to 100 g/m³, the substrate is laminated on to the latter, the coating is cured in a further drying tunnel at ca. 120° to 190° C. (preferably 140° to 170° C.), and the coated substrate is removed from the release carrier. Obviously, it is also possible to produce only the outer, intermediate, or anchor coating by this coating process and to use other coating systems known in the art for the other coat.

As already mentioned, the reactive compositions can also be applied directly to the textile substrate by the direct coating process. In this connection, the non-delaminating and solvent-free or low-solvent nature of the reactive compositions according to the invention is of great advantage in producing thick tarpaulin coatings. With application amounts of 100 to 200 g/m², ca. 0.4 mm thick industrial coatings can be produced in this way in a single work stage.

If foamed layers are to be produced with the reactive compositions according to the invention, then blowing agents and conventional foam stabilizers are added to the reacted compositions. Suitable additives are described, for example, in German Offenlegungsschrift 1,794,006 (British Patent 1,211,339), as well as in U.S. Pat. No. 3,262,805.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Prepolymer (A1)

2004 g of a hydroxy polyether based on trimethylolpropane, propylene oxide, and ethylene oxide having a molecular weight of 6000 and 126 g of a hydroxy polyether based on bisphenol A and propylene oxide having a molecular weight of 560, as well as 9 g of trimethylolpropane, were reacted with 2162 g of DESMODUR® W (4,4'-diisocyanatodicyclohexylmethane, commercially available from BAYER AG) at 100° C. to 110° C. until the calculated NCO content of 14.5 wt. % was reached. 4 g of dibutyl phosphate were added and the excess 4,4'-diisocyanatodicyclohexylmethane was removed by means of thin-layer evaporation at 150° C. to 180° C. under a pressure of 0.1 mbar. The prepolymer had a viscosity of 20,000 mPa·s at 23° C., a specific NCO content of 2.65 wt. %, and thus an equivalent weight of 1585.

Prepolymer (A2)

2004 g of a hydroxy polyether based on trimethylolpropane, propylene oxide, and ethylene oxide having a molecular weight of 6000 and 126 g of a hydroxy polyether based on bisphenol A and propylene oxide having a molecular weight of 560 were reacted with 1900 g of DESMODUR® W at 100° C. to 110° C. until the calculated NCO content of 13.6 wt. % was reached. 4 g of dibutyl phosphate were added and the excess 4,4'-diisocyanatodicyclohexylmethane was removed by means of thin-layer evaporation at 150° C. to 180° C. under a pressure of 0.1 mbar. The prepolymer had a viscosity of 20,000 mPa·s at 23° C., a specific NCO content of 2.4 wt. %, and thus an equivalent weight of 1750.

Prepolymer (A3)

578 g of a hydroxy polyester based on hexanediol-1,6, neopentyl glycol, and adipic acid having a molecular weight of 1700 and 800 g of a hydroxy polyether based on trimethylolpropane, propylene oxide, and ethylene oxide having a molecular weight of 6000, as well as 400 g of a hydroxy polyether based on propylene glycol and propylene oxide having a molecular weight of 1000 and 9 g of 1,4-butanediol, were reacted with 2725 g of DESMODUR® W at 100° C. to 110° C. until the calculated NCO content of 17.4 wt. % was reached. The excess 4,4'-diisocyanatodicyclohexylmethane was removed by means of thin-layer evaporation at 150° C. to 180° C. under a pressure of 0.1 mbar. The prepolymer was diluted with methoxypropyl acetate to 94.5 wt. % solids content and had a viscosity of 20,000 mPa·s at 23° C., a titrated NCO content of 3.5 wt. %, and thus an NCO equivalent weight of 1200.

Component (B1)

100 g of 1,4-bis(2-hydroxyethoxy)benzene were mixed with 100 g of a hydroxy polyether based on propylene glycol and propylene oxide having a mean molecular weight of 2000 in a dissolver to form a paste. The resultant curing agent paste had a OH content of 9.4 wt. % and thus an equivalent weight of 180. The proportion of OH groups from 1,4-bis(2-hydroxyethoxy)benzene was 91 mole %.

Component (B2)

100 g of 1,4-bis(2-hydroxyethoxy)benzene were mixed with 100 g of a polyether triol based on trimethylolpropane, propylene oxide, and ethylene oxide having a mean molecular weight of 6000 in a dissolver to form a paste. The resultant curing agent paste had a OH content of 9.6 wt. % and thus an equivalent weight of 189. The proportion of OH groups from 1,4-bis(2-hydroxyethoxy)benzene was 95 mole. %.

Example 1

1585 g of prepolymer (A1) were mixed with 180 g of component (B), 3.53 g of dibutyltin dilaurate, and 3.53 g of isooctyl mercaptoacetate, as well as 50 g of a flow control agent. The mixture had an initial viscosity of about 10,000 mPa·s, measured at 23° C., and a pot life of 8 hours. After application to a release paper in a layer thickness of ca. 100 μm, the mixture was cured by stepwise heat treatment (3 min. at 80° C., 3 min. at 120° C., and 3 min at 160° C.). An elastic, homogeneous film having excellent mechanical properties was obtained:

| | |
|---|---|
| Modulus (100%) | 3.3 MPa |
| Tensile strength | 7.3 MPa |
| Elongation at break | 400% |
| Ethyl acetate swelling | 258% |

Example 2

1750 g of prepolymer (A2) were mixed with 180 g of component (B) and 9.36 g of a commercially available catalyst (FOMEREZ® UL 29, commercial product from WITCO), as well as 54 g of a flow control agent. The mixture had an initial viscosity of about 12,000 mPa·s, measured at 23° C., and a pot life of 5 to 6 hours. After application to a release paper in a layer thickness of ca. 100 μm, the mixture was cured as described in Example 1. An elastic, homogeneous film having excellent mechanical properties was obtained, which by virtue of its softening point below 200° C. could also be welded:

| | |
|---|---|
| Modulus (100%) | 2.6 MPa |
| Tensile strength | 7.5 MPa |
| Elongation at break | 420% |
| Ethyl acetate swelling | 400% |
| Water swelling | 13% |

Example 3

1200 g of prepolymer (A3) were mixed with 180 g of component (B 1), 2.76 g of dibutyltin dilaurate, 2.76 g of isooctyl mercaptoacetate, and 39 g of a flow control agent. The mixture had an initial viscosity of about 15,000 mPa·s and a pot life of about 8 hours. A film applied to a release paper in a layer thickness of about 100 μm was cured as described in Example 1. A compact and elastic polyurethane film having the following mechanical values was obtained:

| | |
|---|---|
| Modulus (100%) | 4.2 MPa |
| Tensile strength | 5.0 MPa |
| Elongation at break | 200% |
| Ethyl acetate swelling | 600% |
| Water swelling | 6% |

Example 4

1750 g of prepolymer (A2) were mixed with 189 g of component (B2), 3.88 g of dibutyltin dilaurate, 3.88 g of isooctyl mercaptoacetate, and 54 g of a flow control agent. The mixture had an initial viscosity of about 10,000 mPa·s and a pot life of about 8 hours. After application to a release paper in a layer of thickness of ca. 100 μm, the mixture could be cured as described in Example 1. An elastic, soft film was obtained:

| | |
|---|---|
| Modulus (100%) | 2.6 MPa |
| Tensile strength | 6.0 MPa |
| Elongation at break | 440% |
| Ethyl acetate swelling | 430% |

Application Example

This application example describes the preparation of a textile coating from a cotton substrate, an anchor coating, and a cover layer by the reverse coating process. The anchor coating paste consisted of the mixture described in Example 1 and the outer coating paste consisted of the formulation of Example 3 together with 10 wt. % of a commercially available ground pigment, 0.2 wt. % of silicone oil, and 2.5 wt. % of a silicate filler.

The outer coating paste was applied by means of a roller knife in an amount giving 80 g/m² to a release paper on a coating machine with 2 spreaders and was cured in a drying tunnel at 160° C. for 3 minutes. On the second spreader the anchor coating paste was applied with a knife in a similar manner in an amount giving 60 g/m² to the cured top coating. The textile length, a roughened cotton fabric, was then laminated onto the coated release paper. The anchor coating was finally cured for 3 to 4 minutes at 160° C. in the second drying tunnel.

The coating had a Shore A surface hardness of 70 and exhibited good folding resistance and good light fastness.

What is claimed is:

1. A reactive composition comprising:
    (A) an NCO prepolymer prepared i) by reacting an aliphatic and/or cycloaliphatic polyisocyanate with a polyhydroxyl compound at an NCO to OH ratio of from 4:1 to 15:1, and ii) removing unreacted isocyanate to give a monomeric polyisocyanate content of less then 2% by weight, said prepolymer having an NCO content of from 2 to 4% by weight and (B) an amine-free chain extender comprising at least 50 equivalent percent, relative to the NCO-reactive groups of the chain extender, of a compound melting between 50° C. and 160° C. and having the formula (I)

HO—X—Y—X—OH  (I)

wherein
V denotes 1,4-, 1,3-, or 1,2-phenylene and
X denotes methylene or —OCH$_2$CH$_2$-, wherein the oxygen atom is bonded to the group Y, and
(C) 0 to 20% by weight, relative to component (A), of one or more inert organic solvents, and
wherein the equivalent ratio of the free NCO groups of component (A) to the NCO-reactive groups of component (B) is 0.90 to 135.

2. A composition according to claim 1 wherein compound (I) is 1,4-bis(2-hydroxyethoxy)benzene.

3. A composition according to claim 1 having a monomeric polyisocyanate content of less than 0.5 wt. % relative to component (A).

4. A composition according to claim 1 containing 0 to 15% by weight, relative to component (A), of an inert organic solvent.

5. A reactive composition according to claim 1 wherein amine-free chain extender (B) is insoluble in NCO prepolymer (A) at temperatures below 50° C.

6. A composition according to claim 1 wherein NCO prepolymer (A) has a number average molecular weight of 700 to 8000.

7. A composition according to claim 1 wherein NCO prepolymer (A) is a prepolymer based on 4,4'-diisocyanatodicyclohexylmethane.

8. A composition according to claim 1 wherein component (A) is the reaction product of an organic polyisocyanate and (i) a polypropylene oxide polyether and/or polyethylene oxide polyether containing 2 to 3 hydroxyl groups and having a mean molecular weight of 500 to 8000 and/or (ii) an adipic acid polyester containing 2 to 3 hydroxyl groups end having a mean molecular weight of 1000 to 6000.

9. A composition according to claim 1 wherein the equivalent ratio of the free NCO groups of component (A) to the NCO-reactive groups of component (B) is 1 to 1.25.

10. A method for coating a substrate comprising applying a composition according to claim 1 to said substrate.

11. A method according to claim 10 wherein the substrate is a leather textile, wood, paper, plastic, charcoal, silica or metal oxide.

* * * * *

UNITED STATES PATENT AND TRADEMARK OFFICE
CERTIFICATE OF CORRECTION

PATENT NO.         : 6,624,282 B2                                              Page 1 of 1
APPLICATION NO. : 08/908655
DATED               : September 23, 2003
INVENTOR(S)        : Stefan Groth et al.

It is certified that error appears in the above-identified patent and that said Letters Patent is hereby corrected as shown below:

Col. 11, line 9
  replace "V denotes"
  with --Y denotes--.

Col. 11, line 16
  replace "0.90 to 135"
  with --0.90 to 1.35--.

Signed and Sealed this

Thirtieth Day of January, 2007

JON W. DUDAS
*Director of the United States Patent and Trademark Office*